United States Patent

Kawasaki

[11] 3,836,924
[45] Sept. 17, 1974

[54] FLASH CONTROL SYSTEMS FOR CAMERAS

[75] Inventor: Masahiro Kawasaki, Tokyo, Japan

[73] Assignee: Asahi Kogaku Kogyo Kabushiki Kaisha, Itabashi-ku, Tokyo-to, Japan

[22] Filed: Sept. 19, 1973

[21] Appl. No.: 398,807

[30] Foreign Application Priority Data
Sept. 21, 1972 Japan.............................. 47-94930

[52] U.S. Cl.................... 354/33, 315/151, 315/155, 354/60, 354/145, 354/149
[51] Int. Cl...................... G03b 15/03, H05b 41/36
[58] Field of Search .......... 95/10 C, 10 CE, 10 CT; 315/149, 151, 155

[56] References Cited
UNITED STATES PATENTS
3,706,266  12/1972  Uno et al...................... 95/10 CE X
3,709,123  1/1973  Tokutomi........................ 95/10 CE

*Primary Examiner*—Joseph F. Peters, Jr.
*Attorney, Agent, or Firm*—Steinberg and Blake

[57] ABSTRACT

A control system for flash illumination of a camera which operates with preparatory and main flash illumination. The camera has an internal photosensitive element which receives only the light created during the preparatory flash illumination and converts this light into a corresponding electrical quantity. A suitable preparatory electrical circuit receives this latter electrical quantity and converts it into a corresponding current. A flash terminating control is provided for automatically terminating the main flash operation, and between this latter control and the preparatory electrical circuit there is a main electrical circuit which receives one input in the form of the current provided by the preparatory electrical circuit, so as to utilize this one input to determine when to actuate the flash terminating control. A simulating electrical circuit is electrically connected with the main electrical circuit to provide a signal simulating that which would be provided if the main flash illumination were received by the internal photosensitive element, and by way of this simulated signal it is possible to provide a second input to be combined together with the above first input to provide a proper determination of the instant when the main flash will be terminated.

14 Claims, 12 Drawing Figures

FLASH CONTROL SYSTEMS FOR CAMERAS

BACKGROUND OF THE INVENTION

The present invention relates to cameras.

In particular, the present invention relates to flash control systems for cameras.

As is well known, in single lens reflex cameras it is customary to measure light internally after the light has travelled through the objective of the camera. However, the travel of light to the light measuring element which is situated internally of the camera is necessarily interrupted during actual exposure of the film. As a result, when utilizing flash illumination of an object which is to be photographed, this illumination cannot be internally measured.

In order to solve this problem it has already been proposed to utilize a preparatory flash illumination prior to the main flash illumination, and of course the measuring of the light during the preparatory flash illumination can be utilized in a known way to control the main flash illumination. However, with conventional systems of this type where the light received during the entire preparatory flash illumination is measured and memorized, it is essential to carry out with a suitable electrical circuit a computation according to which the amount of main flash which follows the preparatory flash will be equal to the amount of light received during the main flash multiplied by a fraction derived from dividing the preparatory flash illumination amount by the actual amount of light received during the preparatory flash illumination.

Computation circuits of this latter type are extremely complex and do not have the desired accuracy. These circuits include an extremely large number of switches and connectors so that they are expensive to manufacture and assemble.

SUMMARY OF THE INVENTION

It is accordingly a primary object of the present invention to provide a system for controlling the flash illumination of a camera in a manner which will avoid the above drawbacks.

In particular, it is an object of the present invention to provide a system which enables a highly effective accurate control to take place during exposure of film with flash illumination while eliminating the necessity of a large number of switches and connectors and instead providing an exceedingly simple circuit which is highly effective in its operation.

In particular, it is an object of the present invention to provide a system which, if desired, does not even require that the light created during main flash illumination be received and converted into a corresponding electrical signal.

Thus, it is an object of the present invention to provide a system of the above type which is far more accurate than previously known similar systems while at the same time being simpler in its construction and more reliable in its operation.

According to the invention the camera has a flash means capable of carrying out a preparatory flash illumination and a subsequent main flash illumination. An internal photosensitive means is situated within the camera for receiving light which has traveled through the objective thereof only during the preparatory flash operation of the flash means and for converting the thus-received light into a corresponding electrical quantity. A preparatory electrical circuit means is electrically connected with the internal photosensitive means for receiving the latter electrical quantity therefrom and for converting this quantity to a corresponding current. A flash terminating means is electrically connected with the flash means for automatically terminating the main flash operation thereof. A main electrical circuit means is electrically connected between the preparatory electrical circuit means and the flash terminating means for receiving as one input the current from the preparatory electrical circuit means and for utilizing this one input in the control of the flash terminating means. A simulating electrical circuit means for simulating an electrical signal corresponding to that which would be provided by the internal photosensitive means if the latter received light during the main flash operation of the flash means is electrically connected with the main electrical circuit means for transmitting a second input thereto which together with the above one input is utilized in the control of the flash terminating means.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
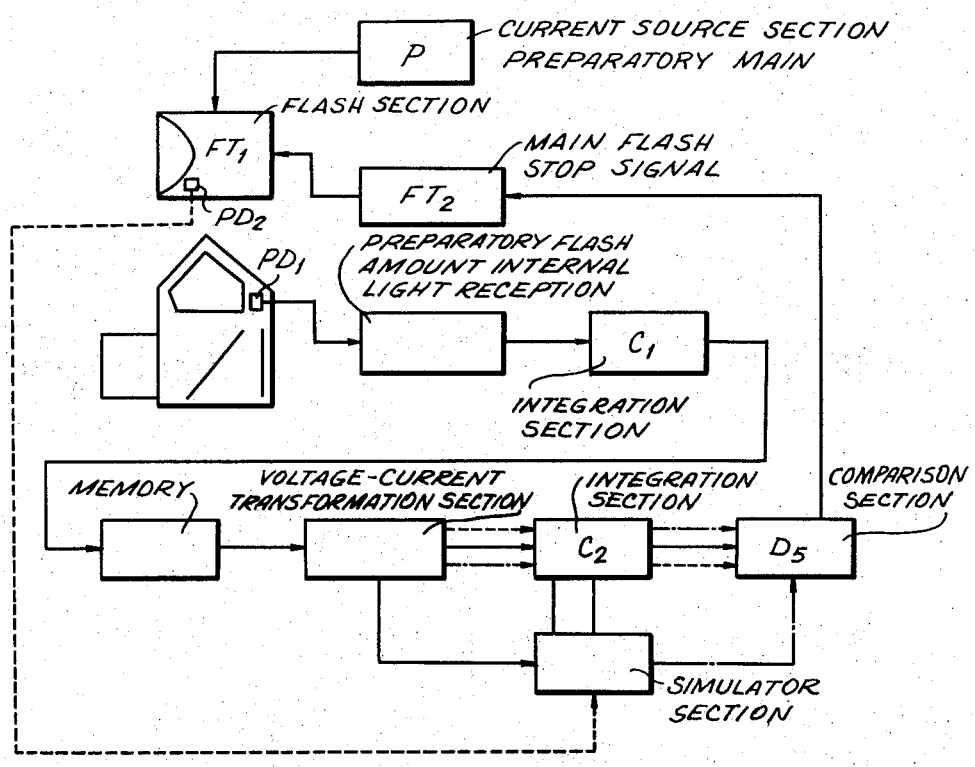
FIG. 1 is a schematic block diagram illustrating the principle of operation of the system of the invention.

Referring first to FIG. 1, the principle according to which the present invention operates is schematically illustrated therein. Thus, it will be seen that at the top of FIG. 1 there is an indication of a current source section P which provides the energy to be utilized both during main flash and the preliminary or preparatory flash. This source of current supplies its energy to a flash means $FT_1$ which is indicated schematically as the flash section in FIG. 1. Situated just below the flash section in FIG. 1 is the schematically single illustrated single lens reflex camera which has the schematically illustrated objective through which light enters to be reflected upwardly by the inclined mirror and after travelling through the viewfinder prism this light is received by a photosensitive means $PD_1$ which through the circuitry designated by the block preparatory flash amount internal light reception causes an integration section formed by a capacitor $C_1$ to provide an integration-memorized electrical quantity as indicated by the following memory block in FIG. 1. This electrical quantity resulting from the internal light measurement is indicative of a combination of photographic conditions including not only the amount of light received by the internal photosensitive means $PD_1$ but also such factors as the selected diagram setting, the speed of the film, and the distance between the camera and the object which is photographed.

Subsequent to the preparatory flash illumination the actual exposure will be made while main flash illumination is carried out, and at this time the inclined mirror is in its upper position permitting the film to be exposed, so that the light cannot be received at this time by the photosensitive means $PD_1$. At this time when the main flash illumination operation is going forward, the previously achieved memory value is transformed into current at the voltage-current transformation section shown in FIG. 1, and this current together with the function of the main flash illumination is integrated, and upon reaching a certain value the main flash is terminated.

In accordance with the invention a simulating circuit means is provided for providing a signal which simulates the electrical quantity which would be achieved from the internal photosensitive means $PD_1$ if the latter in fact did receive the light resulting from the main flash illumination. This result of the invention can be achieved in a number of different ways. Thus, it will be seen that the voltage-current transformation section transmits a signal to a second integration section designated by an integration capacitor $C_2$, with three different arrows being provided between the latter two blocks in order to designate three possible different ways of achieving the results of the invention. It will be noted that below the integration section designated by the integration capacitor $C_2$ there is a simulator section block which indicates the simulating circuit means for introducing the simulated signal.

According to one of the embodiments of the invention, an external photosensitive means $PD_2$ is situated at a location which is to the rear of the flash means $FT_1$ so as to receive the light reflected back during the main flash illumination, and this external photosensitive means $PD_2$ is electrically connected, as shown by the dotted arrow, with the simulator section so as to provide in this way a signal simulating that which would be provided by the internal photosensitive means $PD_1$ if the latter did in fact receive the main flash illumination. Thus, the simulated signal achieved in this way is received as an input by the second integration capacitor $C_2$ which also receives an input, as shown by the top dotted arrow between the voltage-current transformation section and the integration section $C_2$, from the latter voltage-current transformation section. These two inputs are combined so that a signal will be received by the comparison circuit means designated in FIG. 1 by the block $D_5$, and in this case the signal is indicated by the lower dotted arrow. The comparison circuit means $D_5$ compares the signal received in this way from the integration section $C_2$ with a predetermined voltage, and when a given relationship is achieved between these voltages a signal is automatically transmitted to the flash terminating means $FT_2$ in order to actuate the latter so as to terminate automatically the operation of the flash means $FT_1$.

However, as may be seen from FIG. 1, it is also possible to achieve the desired results without utilizing the external photosensitive means $PD_2$. Thus, as may be seen by the solid arrows between the voltage-current transformation section and the simulator section of FIG. 1 as well as the solid arrow between the voltage-current transformation section and the integration section $C_2$, it is possible simply to provide from the simulating circuit means a signal which will modify the integration operation carried out by the integration section $C_2$, and then this signal as thus modified, in synchronism with the main flash illumination, is transmitted to the comparison section $D_5$, to provide at the latter the comparison between the received voltage signal and a predetermined reference or comparison voltage signal so that when the latter signals have a predetermined relationship with respect to each other the flash terminating means $FT_2$ will be actuated to terminate automatically the main flash illumination by terminating the operation of the flash means $FT_1$.

A further modification is also possible, as shown by the dot-dash arrows in FIG. 1. Thus, without altering the operation of the integrating section $C_2$, the signal is received thereby from the voltage-current transformation section and is transmitted to the comparison section, as indicated by the dot-dash line arrows before and after the integration section $C_2$. In this case the simulating electrical circuit means formed by the simulator section transmits a simulating signal directly to the comparison section $D_5$, as also indicated by the dot-dash line arrow in FIG. 1, so that by suitable modification of the operation of the comparison electrical circuit means it is possible to derive a proper determination of the instant when the flash-terminating means $FT_2$ is actuated to terminate the operation of the flash means $FT_1$. In the latter two embodiments where no external flash means $PT_2$ is utilized the simulating circuit means takes the form of a suitable RC circuit.

Thus, in accordance with the present invention at the time of the main flash illumination an operation simulating that of light reception by the preparatory flash circuitry is again carried out and when this second or repeated operation reaches a determined point the main flash is terminated.

Figure 2A:
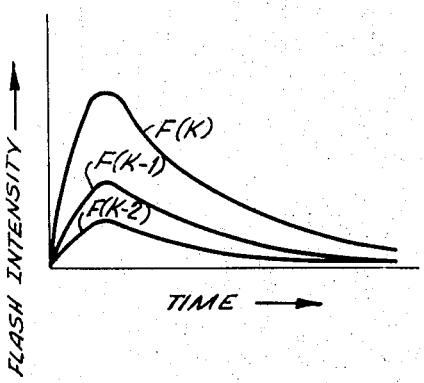
FIGS. 2A-2H respectively illustrate different phases of the operation of the system of the invention in graph form.

Referring now to FIGS. 2A-2H, it will be seen that the graph of FIG. 2A indicates the preparatory flash illumination as received by the internal photosensitive means $PD_1$. Thus, FIG. 2A shows by way of example three curves where the abscissa represents time and the ordinate represents the intensity of flash illumination. By way of example there is shown in the graph of FIG. 2A three curves where the three functions F are designated by way of three different constants K, K-1 and K-2, indicating three sets of conditions under which the flash operation is carried out so that in this way different flash intensities are indicated in the graph of FIG. 2A.

Figure 2B:
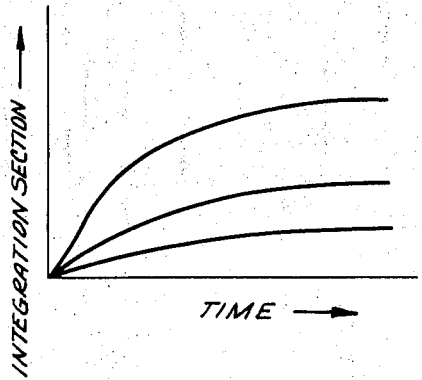
Figure 2C:
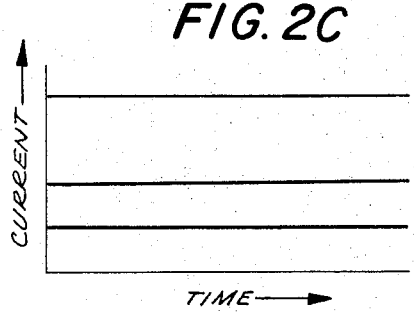

With the circuitry of the invention as described above in connection with the block diagram of FIG. 1 as well as in connection with the circuitry described in detail below, these curves are integrated to provide curves as illustrated in FIG. 2B where the integrated results are plotted agains time, and the final values of the curves of FIG. 2B are the memorized quantities. Transformation of these quantities into current provides the currents of FIG. 2C which are constant with respect to time, as illustrated.

It will be recalled that according to the embodiment where the external photosensitive means $PD_2$ is utilized the function of the main flash is given to such a current value, and in this way a simulation effect is achieved, as if the main flash illumination were actually received by the internal photosensitive means $PD_1$. The curves representing this simulation effect for the three different sets of conditions referred to above in connection with FIG. 2A are respectively illustrated in FIG. 2D.

Figure 2D:
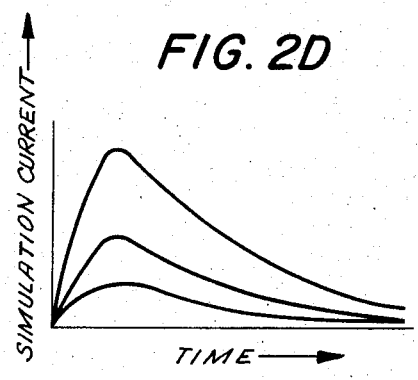
Figure 2E:
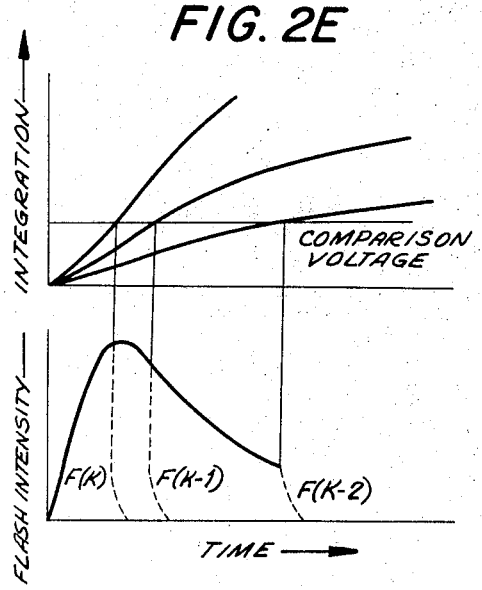

Referring now to FIG. 2E, a pair of graphs are shown therein, these graphs being interrelated since intersections between curves of the upper graph are projected downwardly to achieve intersections on the lower graph. Thus, the upper graph of FIG. 2E represents integration of the curves of FIG. 2D and comparison thereof with a comparison or reference voltage which is indicated in FIG. 2E. The intersections between the comparison voltage and the integration curves in the upper graph of FIG. 2E are projected vertically downward onto the main flash intensity curve plotted with respect to time in the lower graph of FIG. 2E. Thus, the intersections between the main flash intensity curve and the vertical projections from the above intersections of the upper graph of FIG. 2E will determine the proper instant when the main flash illumination is to be terminated for the three different sets of photographing conditions as referred to above, these conditions being designated in the same way at the lower graph of FIG. 2E. Thus, the main flash amount is controlled in such a way as to give a constant received light amount, and when this constant received light amount is determined by the speed of the film which is exposed, for example, then the main flash amount will be properly determined.

Figure 2F:
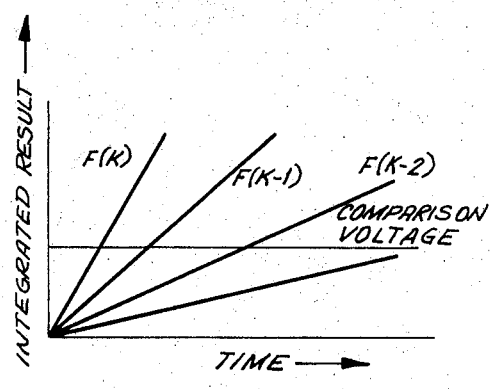
Figure 2G:
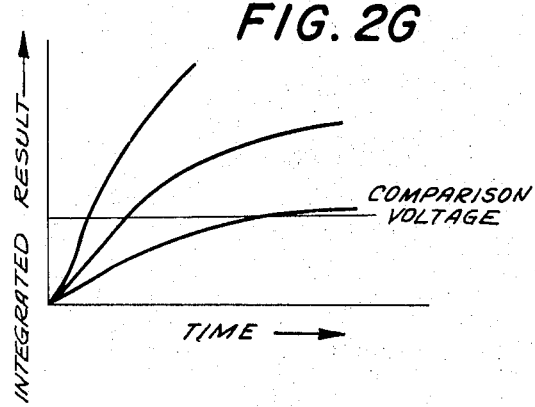
Figure 2H:
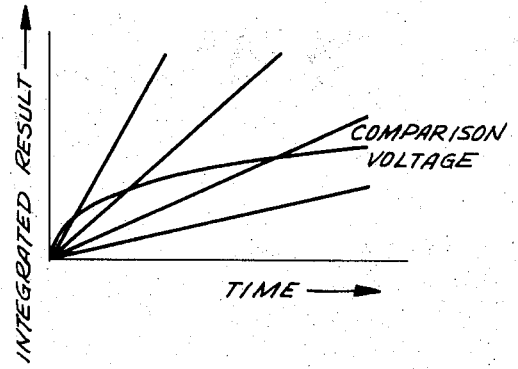

If, however, instead of transmitting the simulating signal in the above manner to the current prior to the main integration which takes place simultaneously with film exposure the integration memory voltage is transformed into current and then directly integrated without any simulating signal, the result will be as illustrated in FIG. 2F. If at this time main flash control is carried out by comparison with a constant voltage, as designated by the comparison voltage in FIG. 2F, then the result is a control where sequential multiplication occurs with respect to time, so that a correct control cannot be achieved because the main flash illumination when compared with the comparison voltage would give a first function of time, and this would require subsequent additional correction based upon the integration curve of FIG. 2F which is a further function of time. Therefore, these curves are not suitable for achieving correct control. However, if the funciton of the flash amount is given by way of a simulated signal to this integration amount, as shown by the solid line arrows of FIG. 1 at the simulating circuit section, as described above, or if the function of the flash amount is given as a simulated signal to the comparison voltage, as described above in connection with the dot-dash line arrows in FIG. 1 and as illustrated by the graph of FIG. 2G, then in either of these cases the amount of light is controlled in a sequential-multiplication manner achieving a proper determination of the main flash amount as illustrated in the graph of FIG. 2H. As was indicated above these simulated signals provided where an external photosensitive means is not used may take the form of suitable RC circuits.

Figure 3A:
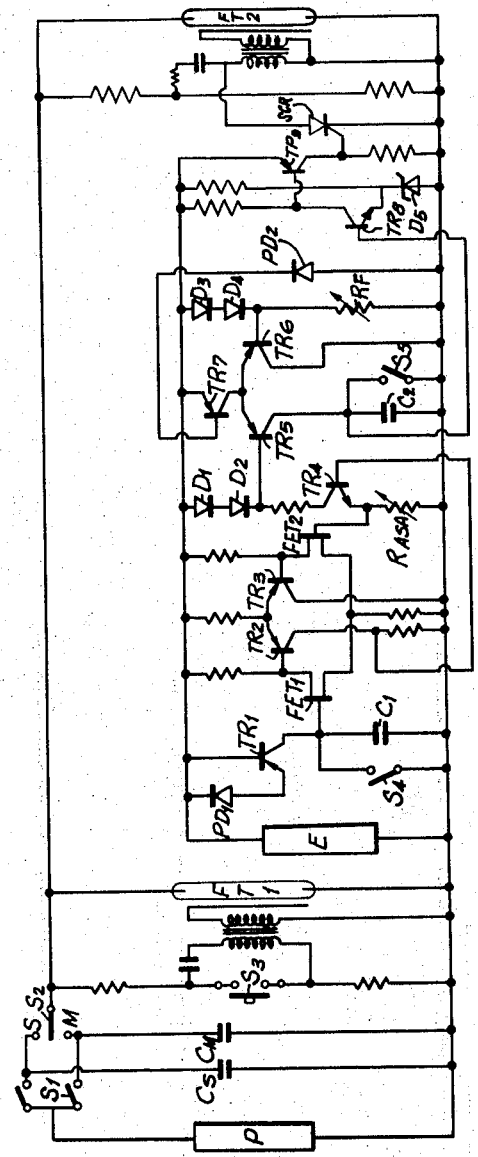
FIG. 3A is a wiring diagram of one possible system according to the invention.

One particular example of the present invention is illustrated in FIG. 3A. Referring now to FIG. 3A there is shown a wiring diagram forming one embodiment of the structure shown in FIG. 1. A high voltage DC source P is used to charge up a main flash accumulating capaciter $C_M$ and a preparatory flash accumulating capacitor $C_S$ when a preparatory main current source switch $S_1$ is closed. A discharge flash tube $FT_1$ is placed in parallel across the capacitors and can be interconnected with either of them by means of the changeover switch $S_2$. When the switch $S_2$ is in position M the discharge flash tube $FT_1$ is energized by capacitor $C_M$, and when the switch $S_2$ is in position S the discharge flash tube $FT_1$ is energized by means of capacitor $C_S$. The discharge flash tube $FT_1$ is triggered by means of the secondary of transformer $T_1$ whose primary is connected by means of a capacitor across a switch $S_3$. The ends of the switch $S_3$ are connected respectively across the ends of the discharge flash tube $FT_1$ by means of resistors $R_1$ and $R_2$, respectively.

A low voltage DC source E provides, when an unillustrated switch in series therewith is closed, energy to preparatory flash detecting photo diode $PD_1$ whose anode is connected to a transistor $TR_1$, the collector of which is connected through capacitor $C_1$ to the other end of the DC source E. Switch $S_4$ is connected in parallel across the capacitor $C_1$. The interconnection between the collector of transistor $TR_1$ and the capacitor $C_1$ feeds the closed loop control circuit containing a differential amplifier consisting of field effect transistors $FET_1$ and $FET_2$ and transistors $TR_2$ and $TR_3$. Appropriate resistors are interconnected as is known in the art. The gate of $FET_2$ is coupled to a variable resistor $R_{ASA}$ which is also in the emitter circuit of a transistor $TR_4$. The collector of $TR_4$ contains the diodes $D_1$ and $D_2$. The collector of $TR_4$ is interconnected to the logarithmic expansion transistors $TR_5$ and $TR_6$. The base of $TR_6$ is connected between the diodes $D_3$, $D_4$ on the one hand and the variable resistor $R_F$ on the other hand and the combination of diodes $D_3$, $D_4$ and resistor $R_F$ is connected across the voltage source E. The emitters of $TR_5$ and $TR_6$ are interconnected and coupled to the collector of $TR_7$ whose base is in series with photo diode $PD_2$, which is positioned to receive light from the flash means of the camera. Capacitor $C_2$, with switch $S_5$ connected in parallel thereacross, is connected in the collector circuit of transistor $TR_5$. The connection of the capacitor $C_2$ to the collector is also coupled to the base of transistor $TR_8$ whose emitter is connected across Zener diode $D_5$ and whose collector is coupled to the base of transistor $TR_9$. The collector of the transistor $TR_9$ is connected to the gate of an SCR whose anode is connected to the primary of a transformer $T_2$ the secondary thereof serving to trigger a flash quenching tube $FT_2$ which is connected in parallel with $FT_1$.

The time sequence of the operation of the switches is as follows. Initially, the switch $S_1$ is opened, after capacitors $C_S$ and $C_M$ are charged, the switch $S_2$ is closed onto contact S, the switch $S_3$ is opened, the switch $S_4$ is closed and the switch $S_5$ is closed. When the preparatory flash is commenced, switch $S_4$ is opened and simultaneously the switch $S_3$ is closed thereby triggering the discharge tube $FT_1$ which produces the preparatory flash determined by the charge on the capacitor $C_S$. After completion of the preparatory flash, the switch $S_2$ is closed on to the M contact and the switch $S_3$ is opened. When the main flash commences, the switch $S_3$ is again closed so as to carry out the main flash and at the same time the switch $S_5$ is opened in synchronism with the opening of the camera shutter.

When the flash means produces a preparatory flash illumination, the photo diode $PD_1$, which is located internally of the camera, receives the light which has travelled through the objective of the camera. This permits the grounded base transistor $TR_1$ to turn on to thereby charge the integration capacitor $C_1$. The voltage across capacitor $C_1$ controls the gate of the field effect transistor $FET_1$ which in turn controls the differential amplifiers $TR_2$ and $TR_3$ and subsequently controls the filed effect transistor $FET_2$. By means of the symmetry of the arrangement, the potential of the capacitor $C_1$ which represents the integrated amount of light intensity being memorized, is impressed on the emitter potential circuit of the transistor $TR_4$. Thus, the memorized voltages will appear across the variable resistor $R_{ASA}$. This variable resistor is utilized to introduce a factor corresponding to speed of the film in the camera. In this manner, the film speed utilized is entered into the circuitry to ultimately contribute to control the main flash illumination. The collector current through the transistor $TR_4$ is therefore equal to the voltage across the capacitor $C_1$ divided by the resistance of the variable resistor $R_{ASA}$. It is recognized that this current will be a function of the light received from the preparatory flash as well as the film speed.

At the base of the transistor $TR_5$, there is produced a logarithmic compression voltage of the current which passes through the collecotr of $TR_4$ because of the presence of the diodes $D_1$, $D_2$. At the same time, there is connected to the base of the transistor $TR_6$ the variable resistor $R_F$ which represents the setting of the diaphragm opening. This value is also logarithmically compressed by means of the diodes $D_3$, $D_4$. The transistors $TR_5$, $TR_6$ function as logarithmic expansion circuits combining the diaphragm setting, the film speed, and the light received from the preparatory flash.

The photo diode $PD_2$ detects the main flash illumination which is subsequently commenced. The current passing through the photo diode $PD_2$ turns on the transistor $TR_7$ whereby the collector current which passes through the transistor $TR_7$ is a function of the current in the photo diode times the base emitter function.

As a result of the current through the transistor $TR_7$, as well as the combination of transistors $TR_5$ and $TR_6$, the collector current of the transistor $TR_5$ is as illustrated in FIG. 2D and is already corrected for the film speed as well as the diaphragm opening of the camera. When, at the time of the synchronized main flash the switch $S_5$ is opened, an integration voltage is produced across the capacitor $C_2$. The capacitor voltage is then compared with a given constant voltage value. The constant value is determined by the potential of the Zener diode $D_5$ plus the base-emitter voltage of the transistor $TR_8$. When the voltage across the capacitor $C_2$ exceeds this constant voltage value, the transistor $TR_8$ becomes conductive which then causes transistor $TR_9$ to conduct. Current through the collector of the transistor $TR_9$ triggers the silicon controlled rectifier SCR to turn on, which thereby energizes the primary of transformer $T_2$, and the secondary thereof triggers the flash quenching tube $FT_2$. As is well known, the resistance of the tube $FT_2$ is much smaller than that of $FT_1$ such that the charge from the capacitor $C_M$ will no longer pass through $FT_1$ but will pass through the discharge tube $FT_2$ thereby terminating the main flash illumination.

Figure 3B:
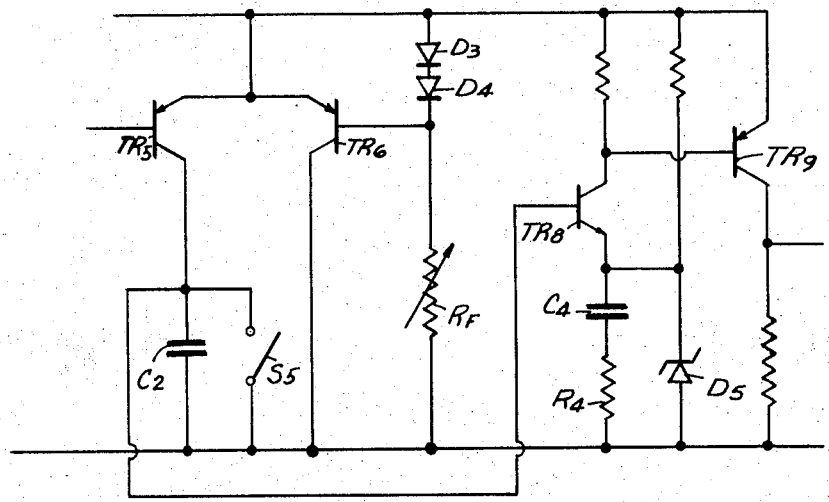
FIGS. 3B and 3C respective illustrate variations of the wiring diagram of FIG. 3A.
Figure 3C:
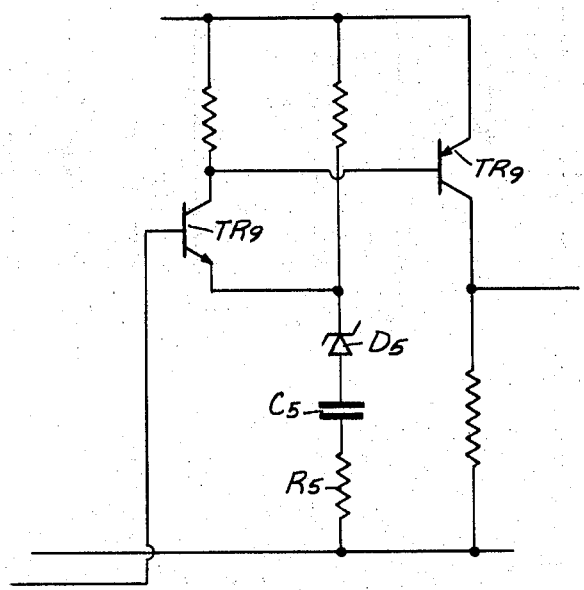

FIGS. 3B and 3C respectively illustrate variations of the wiring diagram of FIG. 3A according to which it is possible to use simulating circuits in the form of RC circuits without utilizing the external photosensitive means $PD_2$. Thus, the circuitry of FIG. 3B is identical with that of FIG. 3A except for the difference illustrated in FIG. 3B. It will be seen that the photosensitive means $PD_2$ and the transistor $TR_7$ are no longer included in the circuit. Instead an RC circuit composed of the resistor $R_4$ and capacitor $C_4$ is connected to the emitter of transistor $TR_8$ in parallel with Zener diode $D_5$ of the comparison circuit means. This RC circuit which forms the simulating circuit means of this embodiment will function to provide a simulating signal modifying the signal transmitted from the capacitor $C_2$ in such a way that the same effect is achieved as if the main flash illumination were in fact received by the internal photosensitive means $PD_1$.

In the case of FIG. 3C, the circuitry also is identical with that of FIG. 3B except for the differences illustrated. Thus, in this case also there is no external photosensitive means $PD_2$ or transistor $TR_7$. Instead an RC circuit $R_5C_5$ is connected in series with Zener diode $D_5$ in the manner illustrated, thus achieving in this way an influence on the comparison circuit means which will modify the relationship between the integrated voltage from the capacitor $C_2$ and the comparison voltage provided by the Zener diode $D_5$ so as to provide an effect which is the same as that which would be achieved if the main flash illumination were in fact received by the internal photosensitive means $PD_1$.

Thus, referring again to FIG. 3A, it will be seen that between the internal photosensitive means $PD_1$ and the second integrating capacitor or main integrating capacitor $C_2$ there is a preparatory electrical circuit means which includes the preparatory integrating capacitor $C_1$ together with the differential amplifier circuit means and the logarithmic compression and the logarithmic expansion circuits which introduce the factors of the film speed and selected diagram aperture as pointed out above. The Zener diode $D_5$ forms the comparison circuit means to which a signal is transmitted from the main electrical circuit means which includes the integrating capacitor $C_2$, and this comparison circuit means acts through the transistor $TR_9$ and the illustrated SCR in order to trigger through the transformer $T_2$ the quenching flash tube $FT_2$ in order to instantaneously terminate the operation of the flash means $FT_1$ as soon as the flash tube $FT_2$ is triggered into operation.

Thus, in accordance with the present invention even though the internal photosensitive means does not receive the main flash illumination, there is actually achievement of an operation which is identical with that which would be achieved if in fact the internal photosensitive means did receive the main flash illumination. Excellent advantages are achieved in the production and use of the structure of the invention in that it is possible to carry out flash control with an extremely high accuracy while at the same time the number of switches and connectors required by the circuit can be reduced as compared with conventional circuitry.

What is claimed is:

1. In a camera having an objective, flash means having a preparatory flash operation and a subsequent main flash operation for providing preparatory flash illumination during said preparatory flash operation and then providing main flash illumination during the subsequent main flash operation, internal photosensitive means situated within the camera for receiving light which has travelled through the objective only during the preparatory flash operation of said flash means and for converting the received light into a corresponding electrical quantity, preparatory electrical circuit means electrically connected with said internal photosensitive means for receiving said quantity therefrom and for converting said quantity into a corresponding current, flash terminating means electrically connected with said flash means for automatically terminating the main flash operation thereof, main electrical circuit means electrically connected between said preparatory electrical circuit means and said flash terminating means for receiving as one input said current from said preparatory electrical circuit means and for utilizing said one input in the control of said flash terminating means, and simulating electrical circuit means for simulating an electrical signal corresponding to that which would be provided by said internal photosensitive means if the latter received light during the main flash operation of said flash means, said simulating electrical circuit means being electrically connected with said main electrical circuit means for transmitting thereto a second input which together with said one input is utilized in the control of said flash terminating means.

2. The combination of claim 1 and wherein said simulating circuit means is also connected electrically with said preparatory electrical circuit means for directly modifying the current which forms said one input in accordance with the signal provided by said simulating circuit means.

3. The combination of claim 2 and wherein said main electrical circuit means includes an integrating circuit means for integrating in synchronism with the main flash operation of said flash means the combined inputs from said preparatory electrical circuit means and said simulating circuit means.

4. The combination of claim 3 and wherein an external photosensitive means is positioned with respect to said flash means for receiving the main flash illumination and is electrically connected with said simulating electrical circuit means for providing the latter with an input corresponding to the main flash illumination.

5. The combination of claim 4 and wherein said main electrical circuit means includes a comparison circuit means electrically connected between said integrating circuit means and said flash terminating means for comparing an input voltage received from said integrating circuit means with a predetermined comparison voltage and for actuating said flash-terminating means to terminate automatically the main flash operation of said flash means when the input voltage exceeds the comparison voltage.

6. The combination of claim 1 and wherein said main electrical circuit means includes an integrating circuit means for receiving said current as said one input and converting the latter into an integration voltage which forms the output of said integrating circuit means, said simulating electrical circuit means being electrically connected with said integrating circuit means for modifying said output thereof in accordance with the signal provided by said simulating circuit means, and said modified output then being utilized for controlling said flash terminating means.

7. The combination of claim 6 and wherein said main electrical circuit means includes a comparison circuit means electrically connected between said integrating circuit means and said flash terminating means for receiving said integration voltage as modified by said signal of said simulating circuit means in the form of an input voltage and for comparing the latter voltage with a predetermined comparison voltage for actuating said flash terminating means to terminate said main flash operation of said flash means when said input voltage exceeds said comparison voltage.

8. The combination of claim 7 and wherein said simulating circuit means is an RC circuit.

9. The combination of claim 1 and wherein said main electrical circuit means includes an integrating circuit means for receiving said current which forms said one input and for converting the latter into a corresponding integration voltage, said main electrical circuit means further including a comparison circuit means electrically connected with said integrating circuit means for receiving said integration voltage therefrom and for comparing said integration voltage with a predetermined comparison voltage for actuating said flash terminating means to terminate the main flash operation of said flash means when said integration and comparison voltages have a predetermined relationship with respect to each other, said simulating circuit means being electrically connected with said comparison circuit means for influencing the relationship between said integration and comparison voltages to determine the termination of said main flash operation in accordance with said relationship between said integration and comparison voltages as modified by said signal of said simulating circuit means.

10. The combination of claim 9 and wherein said simulating circuit means is an RC circuit.

11. The combination of claim 1 and wherein said preparatory electrical circuit means includes a preparatory integration capacitor electrically connected to said internal photosensitive means for providing an integration voltage corresponding to the light received by said internal photosensitive means, differential amplifier circuit means electrically connected with said preparatory integration capacitor and including a transistor having an emitter potential equal to that of the integration capacitor as a result of the action of said differential amplifier circuit means, variable resistor means and logarithmic compression means electrically connected to each other and to the latter transistor for introducing factors such as the speed of the film which is exposed and the diaphragm setting, and logarithmic expansion means electrically connected with said logarithmic compression means for providing therefrom an electrical quantity to be used in determining the duration of the main flash operation, said main electrical circuit means including a main integration capacitor electrically connected with said logarithmic expansion means for receiving said electrical quantity therefrom and providing an integration voltage which is used in determining when the main flash operation is terminated, said main electrical circuit means further including a comparison circuit means for comparing the integration voltage of said main integration capacitor with a predetermined voltage, and between said comparison circuit means and said flash terminating means an electrical means for responding to a predetermined relationship between the comparison voltage and the integration voltage of said main integration capacitor in order to determine the instant of operation of said flash-terminating means.

12. The combination of claim 11 and wherein said simulating circuit means includes an external photosensitive means for receiving the main flash illumination and a transistor connected between said external photosensitive means and said logarithmic expansion means, so that the integration voltage of said main integration capacitor is influenced by the electrical signal derived from said external photosensitive means and transistor connected therebetween and said logarithmic expansion means.

13. The combination of claim 11 and wherein said simulating electrical circuit means includes an RC circuit connected between said main integration capacitor and said comparison circuit means.

14. The combination of claim 11 and wherein said simulating circuit means includes an RC circuit means electrically connected with said comparison circuit means for influencing the relationship between the integration voltage of said main integration capacitor and the comparison voltage.

* * * * *